(12) United States Patent
Farrar

(10) Patent No.: US 6,293,419 B1
(45) Date of Patent: Sep. 25, 2001

(54) FUEL TANK COVER ASSEMBLY FOR FUEL TANK

(75) Inventor: Robert Lee Farrar, Flint, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/684,494

(22) Filed: Oct. 6, 2000

(51) Int. Cl.[7] .................................................. B65D 6/02
(52) U.S. Cl. ........................ 220/562; 220/4.14; 220/23.89
(58) Field of Search ................................. 220/562, 4.14, 220/421, 422, 23.87, 23.89

(56) References Cited

U.S. PATENT DOCUMENTS

| | | | |
|---|---|---|---|
| 2,461,096 | * | 2/1949 | Wagner .................................. 220/1.14 |
| 3,343,703 | * | 9/1967 | Snyder ................................... 220/562 |
| 3,426,937 | * | 2/1969 | Boschi et al. ......................... 220/1.14 |
| 4,444,366 | * | 4/1984 | Limoncelli ............................. 220/562 |
| 5,107,949 | * | 4/1992 | Gotoh et al. ........................... 220/562 |
| 5,398,839 | * | 3/1995 | Kleyn .................................... 220/4.14 |
| 5,934,618 | * | 8/1999 | Kari et al. .............................. 220/562 |
| 6,135,306 | * | 10/2000 | Clayton et al. ....................... 220/562 |
| 6,179,145 | * | 1/2001 | Roth ..................................... 220/4.14 |

* cited by examiner

Primary Examiner—Joseph M. Moy
(74) Attorney, Agent, or Firm—Vincent A. Cichosz

(57) ABSTRACT

A fuel tank cover assembly for a fuel tank of a vehicle includes a cover adapted to close an opening in the fuel tank having a fuel reservoir disposed therein and a universal joint coupling disposed between the cover and the fuel reservoir to allow the cover to be skewed from a bottom of the fuel tank.

20 Claims, 2 Drawing Sheets

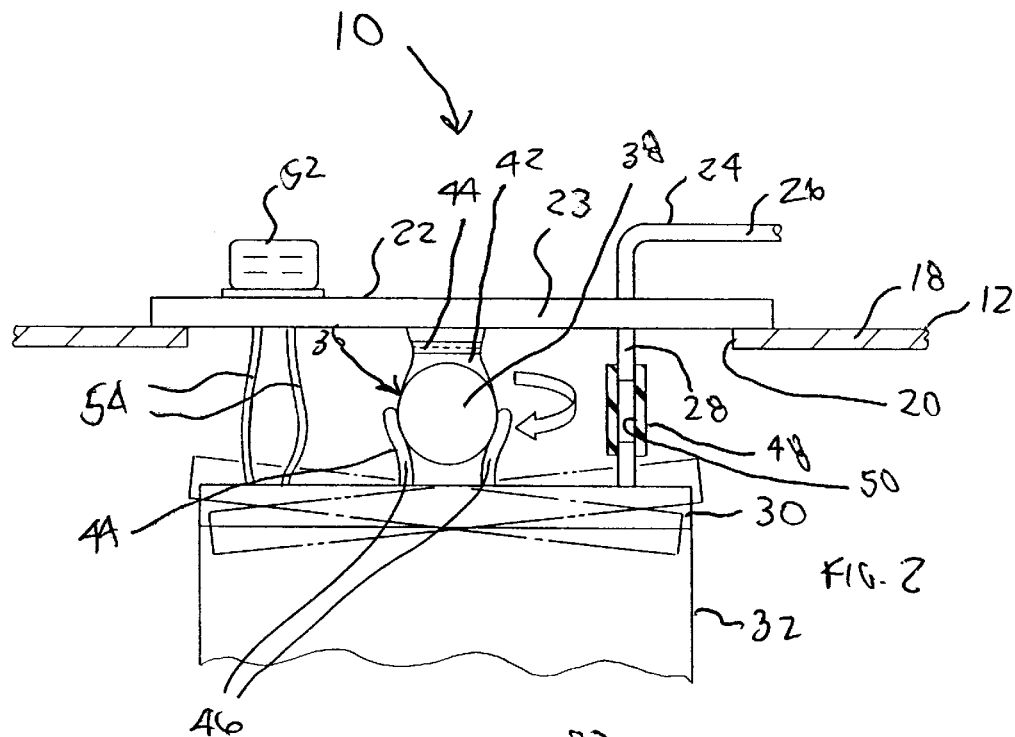
FIG. 2
FIG. 3
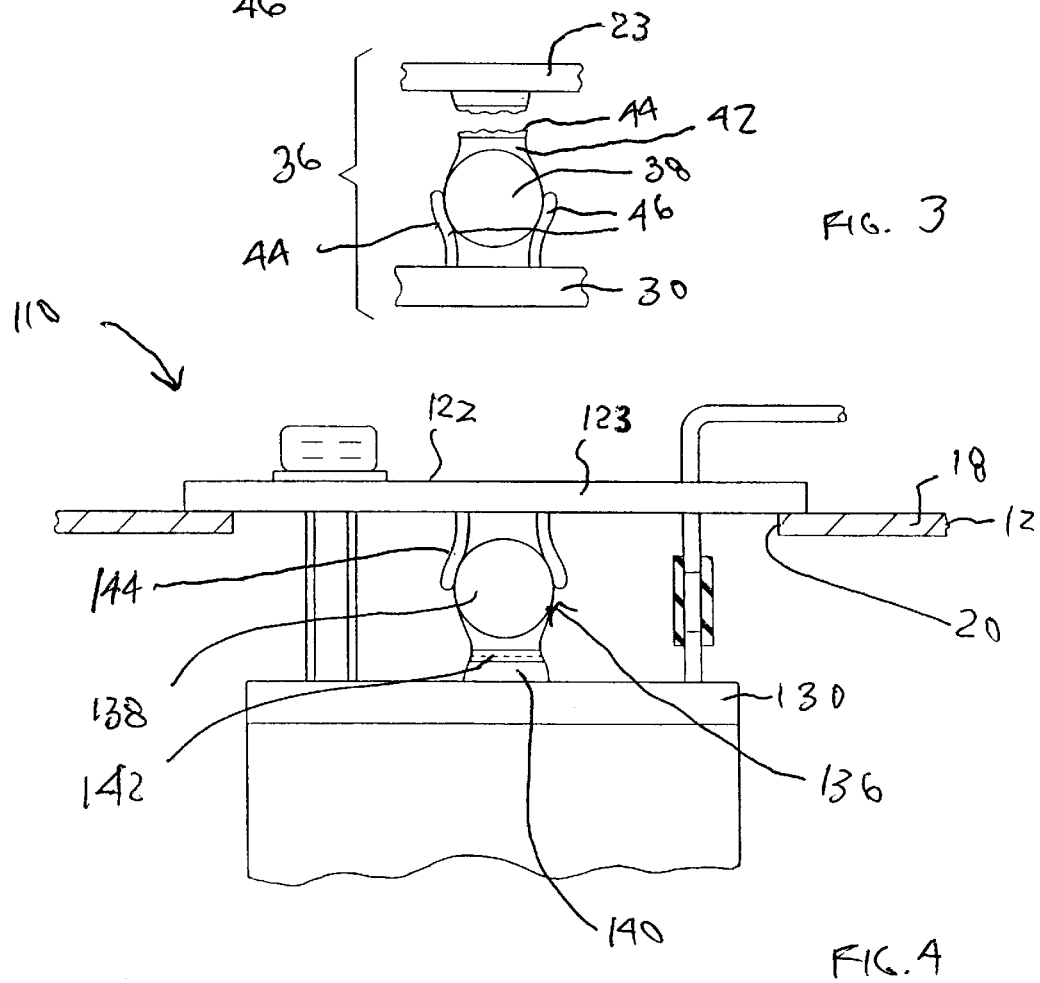
FIG. 4

FUEL TANK COVER ASSEMBLY FOR FUEL TANK

TECHNICAL FIELD

The present invention relates generally to fuel tanks for vehicles and, more particularly, to a fuel tank cover assembly for a fuel tank of a vehicle.

BACKGROUND OF THE INVENTION

It is known to provide a fuel tank such as a plastic fuel tank in a vehicle to hold fuel to be used by an engine of the vehicle. In such a fuel tank, a cover is provided for a fuel reservoir to close a tank opening in the fuel tank. The cover typically has fuel tubes, electrical connector, and rollover valve rigidly attached thereto. Typically, the mounting surface surrounding the tank opening in the fuel tank is not parallel to a bottom of the fuel tank, thereby affecting low fuel indication accuracy. Also, the fuel tank covers are rigidly mounted to the fuel reservoir, which can cause cracks to occur in the fuel tank cover during a severe vehicle impact.

Therefore, it is desirable to provide a fuel tank cover assembly for a vehicle that compensates for the uneven or unparallel condition between the tank opening and the bottom of the fuel tank. It is also desirable to provide a fuel tank cover assembly that allows the bottom referencing of the fuel reservoir while allowing for an unparallel cover position.

SUMMARY OF THE INVENTION

It is, therefore, one object of the present invention to provide a new fuel tank cover assembly for a fuel tank of a vehicle.

It is another object of the present invention to provide a fuel tank cover assembly with a universal joint coupling between a fuel tank cover and a fuel reservoir of a fuel tank.

To achieve the foregoing objects, the present invention is a fuel tank cover assembly for a fuel tank of a vehicle including a cover adapted to close an opening in the fuel tank having a fuel reservoir disposed therein and a universal joint coupling disposed between the cover and the fuel reservoir to allow the cover to be skewed from a bottom of the fuel tank.

One advantage of the present invention is that a new fuel tank cover assembly is provided for fuel tank of a vehicle that allows a fuel tank cover to be skewed from a bottom of the fuel tank. Another advantage of the present invention is that the fuel tank cover assembly has a universal joint coupling that compensates for the unparallel condition between the tank opening and the bottom of the fuel tank, thereby allowing the bottom referencing of the fuel reservoir. Yet another advantage of the present invention is that the fuel tank cover assembly provides mounting flexibility and controlled failure of the fuel reservoir relative to the fuel tank cover. Still another advantage of the present invention is that the fuel tank cover assembly allows the fuel reservoir to be used in less than perfect blow-molded plastic fuel tanks and decrease the incidents of poor low fuel indications. A further advantage of the present invention is that the fuel tank cover assembly increases the robustness of the low fuel level indication.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 2 is an enlarged elevational view of the fuel tank cover assembly of FIG. 1 before a vehicle impact.

FIG. 3 is a partial enlarged fragmentary view of the fuel tank cover assembly of FIG. 1 after a vehicle impact.

FIG. 4 is an enlarged fragmentary elevational view another embodiment, according to the present invention, of the fuel tank cover assembly of FIG. 1.

DESCRIPTION OF THE PREFERRED EMBODIMENT

Figure 1:
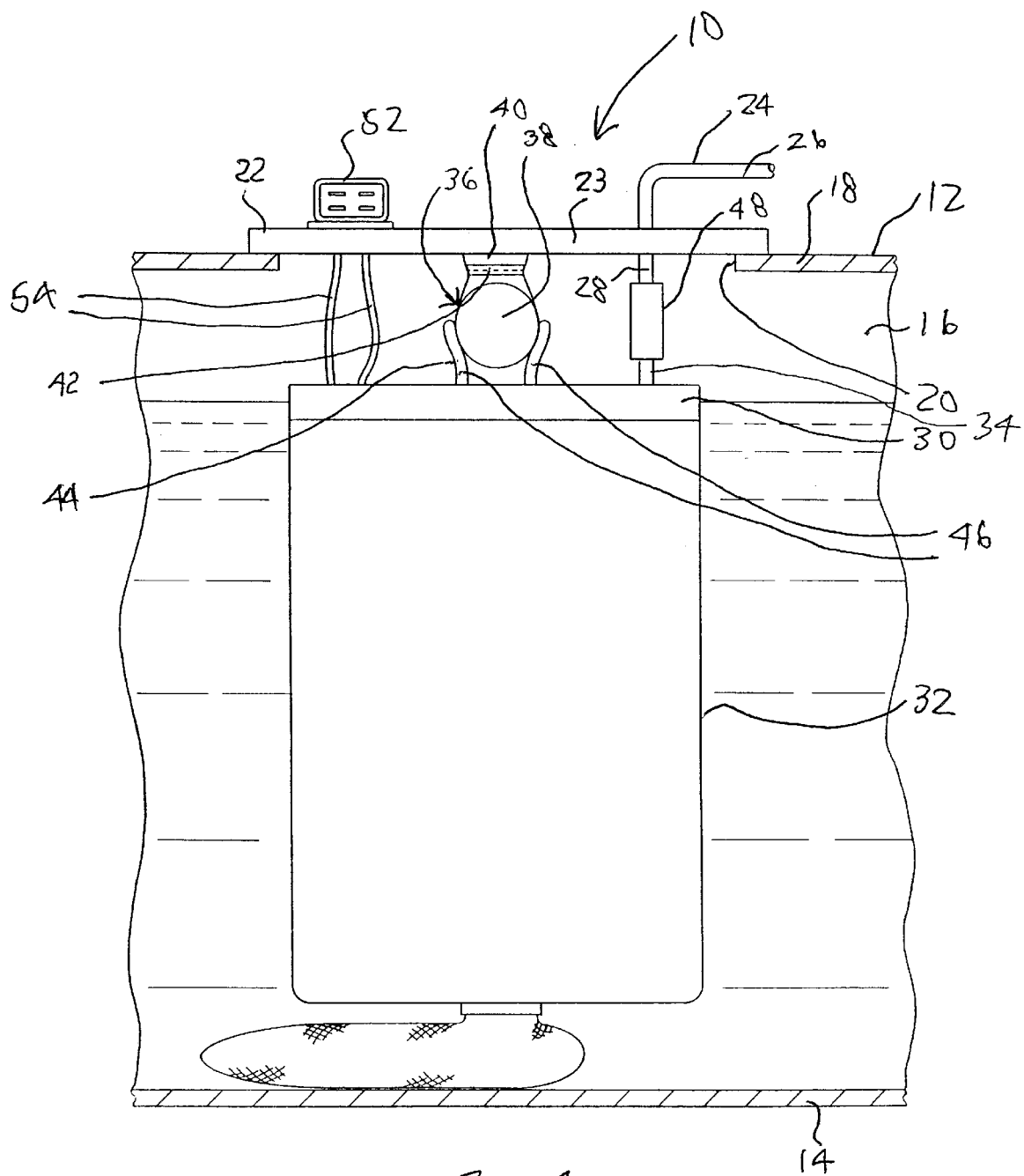
FIG. 1 is a perspective view of a fuel tank cover assembly, according to the present invention, illustrated in operational relationship with a fuel tank.

Referring to the drawings and in particular FIGS. 1 and 2, one embodiment of a fuel tank cover assembly 10, according to the present invention, is shown for a fuel tank 12 of a vehicle (not shown). The fuel tank 12 includes a bottom wall 14 and a side wall 16 around a periphery of the bottom wall 14 and extending generally perpendicular thereto. The fuel tank 12 also includes a top wall 18 around a periphery of the side wall 16 and extending generally perpendicular thereto and generally parallel to the bottom wall 14. The top wall 18 has at least one tank opening 20 therein for the fuel tank cover assembly 10. The fuel tank 12 is made of a rigid material such as plastic. It should be appreciated that, except for the fuel tank cover assembly 10, the fuel tank 12 is conventional and known in the art.

Referring to FIGS. 1 through 3, the fuel tank cover assembly 10 includes a cover 22 to cover or close the opening 20. The cover 22 is generally circular in shape. The cover 22 is made from a plastic material such as polybutylene (PBT) or acetal, which is a conventional material known in the art. The cover 22 includes a first or upper half cover 23 overlapping the tank opening 20 and secured to an outer surface of the top wall 18 by suitable means such as welding.

The fuel tank cover assembly 10 also includes a fuel tube 24 extending through the upper half cover 23. The fuel tube 24 is generally "L" shaped and has an exterior or first portion 26 extending horizontally and an interior or second portion 28 extending vertically. The fuel tube 24 has a passageway (not shown) extending axially through the first portion 26 and second portion 28. The second portion 28 extends vertically from the upper half cover 23 above and below the upper half cover 23. The first portion 26 extends horizontally from the second portion 28 for connection to a fuel hose or conduit (not shown) connected to an engine (not shown) of the vehicle.

The fuel tank cover assembly 10 includes a second or lower half cover 30 spaced vertically from the upper half cover 23. The lower half cover 30 is made of a plastic material, preferably the same plastic material as the upper half cover 23. The upper and lower half covers 23 and 30 are molded by a conventional injection molding process.

The fuel tank 12 includes a fuel reservoir 32 disposed therein and rigidly connected to the lower half cover 30. The fuel reservoir 32 may be of a type disclosed in U.S. Pat. No. 5,218,942 to Coha et al., the disclosure of which is hereby incorporated by reference. The fuel reservoir 32 includes a guide rod 34 extending axially through the lower cover half 30 for connection to the fuel tube 24 in a manner to be described. The guide rod 34 is a tubular member with a generally circular cross-sectional shape. The guide rod 34 has a passageway (not shown) extending axially therethrough. It should be appreciated that the fuel tube 24 and guide rod 34 are not rigidly attached to the cover 22.

The fuel tank cover assembly 10 includes a compensator or universal joint coupling, generally indicated at 36, between the upper half cover 23 and lower half cover 30 to allow the cover 22 to be skewed from the bottom wall 14 of the fuel tank 12. The universal joint coupling 36 includes a ball 38 and a stem 40 attaching the ball 38 to a lower surface of the upper half cover 23. The universal joint coupling 36 may include a breakaway feature such as a notch 42 extending radially inward and spaced axially from the ends of the stem 40. The notch 42 allows the ball 38 to break away from the upper cover half 23 under severe impact conditions. The universal joint coupling 36 also includes a socket 44 for receiving the ball 38 and attached to an upper surface of the lower cover half 30. The socket 44 has a plurality of fingers 46 extending axially and spaced circumferentially to allow defection to receive the ball 38. It should be appreciated that the ball 38 and socket 44 allows rotation between the upper and lower half covers 23 and 30 and automatic compensation for unparallel cover location as illustrated in FIG. 2.

The fuel tank cover assembly 10 includes a fuel connector 48 fluidly connecting the fuel tube 24 and guide rod 42 together. The fuel connector 48 is of a tubular or hollow sleeve type having a passageway 50 extending axially therethrough. The fuel connector 48 has one end disposed over the fuel tube 24 and the other end disposed over the guide rod 34. The fuel tank cover assembly 10 also includes an electrical connector 52 connected to an upper surface of the upper half cover 23 and a plurality of electrical wires 54 extending through the upper half cover 23 and connected to the fuel reservoir 32. It should be appreciated that the electrical wires 54 are not rigidly attached to the cover 22. It should be appreciated that the electrical connector and wires 52 and 54 are conventional and known in the art.

In operation, the universal joint coupling 36 allows for the cover 22 to be skewed from the bottom wall 14 of the fuel tank 12. This will allow the bottom referencing of the fuel reservoir 32 while allowing for an unparallel position between the cover 22 and the fuel reservoir 32. As illustrated in FIG. 2, the universal joint coupling 36 allows for rotation between the upper cover half 23 and lower cover half 30. Under severe impact conditions, the ball 38 breaks away from upper half cover 23, thereby allowing the lower half cover 30 to break away from upper half cover 23 and leaving the cover sealing interfaces unaffected as illustrated in FIG. 3. As a result, the cover 22 and sealing interface thereof will not be damaged by retaining the inertia of the fuel reservoir 32. It should be appreciated that the fuel tank cover assembly 10 allows the fuel reservoir 32 to break away under severe impacts.

Referring to FIG. 4, another embodiment, according to the present invention, of the fuel tank cover assembly 10 is shown. Like parts of the fuel tank cover assembly 10 have like reference numerals increased by one hundred (100). In this embodiment, the fuel tank cover assembly 110 includes the universal joint coupling 136 having the ball 138 attached to the lower half cover 130 of the cover 122 by the stem 140. The universal joint coupling 136 also includes the notch 142 in the stem 140. The universal joint coupling 136 also includes the socket 144 attached to the upper half cover 123 and cooperating with the ball 138. The operation of the fuel tank cover assembly 110 is similar to the operation of the fuel tank cover assembly 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fuel tank cover assembly for a fuel tank of a vehicle comprising:

a cover adapted to close an opening in the fuel tank having a fuel reservoir disposed therein; and a universal joint coupling disposed between said cover and the fuel reservoir to allow said cover to be skewed from a bottom of the fuel tank.

2. A fuel tank cover assembly as set forth in claim 1 wherein said cover is made of a plastic material.

3. A fuel tank cover assembly as set forth in claim 1 wherein said cover comprises a first half cover and a second half cover.

4. A fuel tank cover assembly as set forth in claim 3 wherein said first half cover is for connection to a wall of the fuel tank and said second half cover is for connection to the fuel reservoir.

5. A fuel tank cover assembly as set forth in claim 3 wherein said universal joint coupling comprises a ball having a stem connected to either one of said first half cover and said second half cover and a socket for receiving said ball connected to the other one of said first half cover and said second half cover.

6. A fuel tank cover assembly as set forth in claim 5 wherein said universal joint coupling includes a breakaway mechanism to allow said ball to breakaway from either one of said first half cover and said second half cover.

7. A fuel tank cover assembly as set forth in claim 4 including a fuel tube extending through said first half cover and a guide rod extending through said second half cover.

8. A fuel tank cover assembly as set forth in claim 7 including a fuel connector interconnecting said fuel tube and said guide rod.

9. A fuel tank cover assembly as set forth in claim 4 including an electrical connector connected to said first half cover and a plurality of electrical wires extending through said upper half cover for connection to the fuel reservoir.

10. A fuel tank cover assembly as set forth in claim 5 wherein said socket is molded to said cover.

11. A fuel tank cover assembly as set forth in claim 5 wherein said ball is molded to said cover.

12. A fuel tank cover assembly for a fuel tank of a vehicle comprising:

a plastic cover adapted to close an opening in the fuel tank having a fuel reservoir disposed therein, said cover comprising a first half cover for connection to a wall of the fuel tank and a second half cover for connection to the fuel reservoir; and a universal joint coupling disposed between said first half cover and said second half cover to allow said cover to be skewed from a bottom of the fuel tank.

13. A fuel tank cover assembly as set forth in claim 12 wherein said universal joint coupling comprises a ball having a stem connected to either one of said first half cover and said second half cover and a socket for receiving said ball connected to the other one of said first half cover and said second half cover.

14. A fuel tank cover assembly as set forth in claim 13 wherein said universal joint coupling includes a breakaway mechanism to allow said ball to breakaway from either one of said first half cover and said second half cover.

15. A fuel tank cover assembly as set forth in claim 12 including a fuel tube extending through said first half cover and a guide rod extending through said second half cover.

16. A fuel tank cover assembly as set forth in claim 15 including a fuel connector interconnecting said fuel tube and said guide rod.

17. A fuel tank cover assembly as set forth in claim 12 including an electrical connector connected to said first half cover and a plurality of electrical wires extending through said first half cover for connection to the fuel reservoir.

18. A fuel tank cover assembly as set forth in claim 13 wherein said socket is molded to said cover.

19. A fuel tank cover assembly as set forth in claim 13 wherein said ball is molded to said cover.

20. A fuel tank for a vehicle comprising:

a wall forming a chamber having an opening and a fuel reservoir disposed in said chamber;

a fuel tank cover assembly to close said opening; and said fuel tank cover assembly comprising a plastic cover closing said opening, said cover comprising a first half cover connected to said wall and a second half cover connected to said fuel reservoir; and a universal joint coupling disposed between said first half cover and said second half cover to allow said cover to be skewed from a bottom thereof.

\* \* \* \* \*